Figure 1:
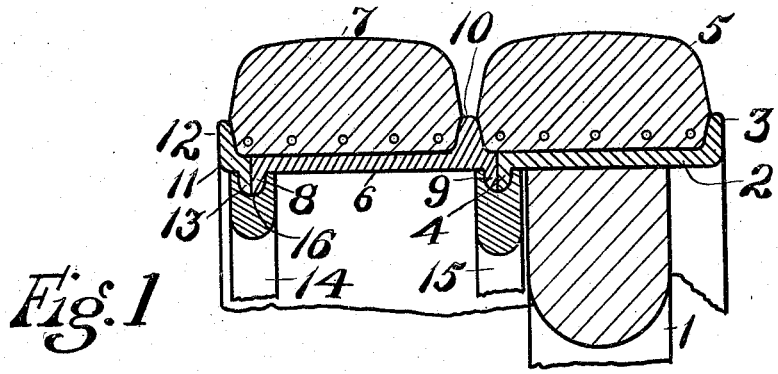

J. M. ALDERFER.
VEHICLE WHEEL RIM.
APPLICATION FILED FEB. 7, 1908.

918,721.

Patented Apr. 20, 1909.

Witnesses:

INVENTOR
John M. Alderfer,
By C. E. Humphrey
ATTORNEY.

UNITED STATES PATENT OFFICE.

JOHN M. ALDERFER, OF SHARON CENTER, OHIO.

VEHICLE-WHEEL RIM.

No. 918,721.    Specification of Letters Patent.    Patented April 20, 1909.

Application filed February 7, 1908. Serial No. 414,768.

*To all whom it may concern:*

Be it known that I, JOHN M. ALDERFER, a citizen of the United States, residing at Sharon Center, in the county of Medina and State of Ohio, have invented new and useful Improvements in Vehicle-Wheel Rims, of which the following is a specification.

This invention has relation to new and useful improvements in vehicle wheel rims and has especial relation to that type known as "quick detachable," wherein the same is provided with at least one tire-retaining element, removable to permit lateral withdrawal of the tire, as contradistinguished from that type wherein it is necessary to stretch the tire over one of the lateral tire-retaining edges or flanges.

The object of this invention, broadly speaking, is to construct a vehicle wheel rim with a seat for a tire carrying along one of its lateral edges a tire-holding or retaining means, said retaining means adapted to coöperate with a tire-retaining means on the opposite side of the rim held in position by a new and improved form of locking device.

Another object of this invention is to so construct a wheel rim that it may be expanded laterally by uniting together detachably a plurality of members each having a seat for a tire and each provided with a tire-retaining means whereby the several independent members are disposed in parallel relation circumferentially to each other.

A further object of this invention is to provide a new and improved locking device capable of locking a detachable tire-retaining member in association with a tire and the rim on which it is mounted, and also of uniting associated or companion rims provided with seats for independent parallel tires, said means in the latter instance being arranged to lock the companion members of said rim in coöperation as well as uniting the tire-retaining means themselves to the rim members.

Other advantages constituting objects of this invention will more fully appear in the subjoined description.

A practical embodiment of this invention is illustrated in the accompanying drawings in which similar reference numerals indicate like parts in the different figures.

Figure 2:
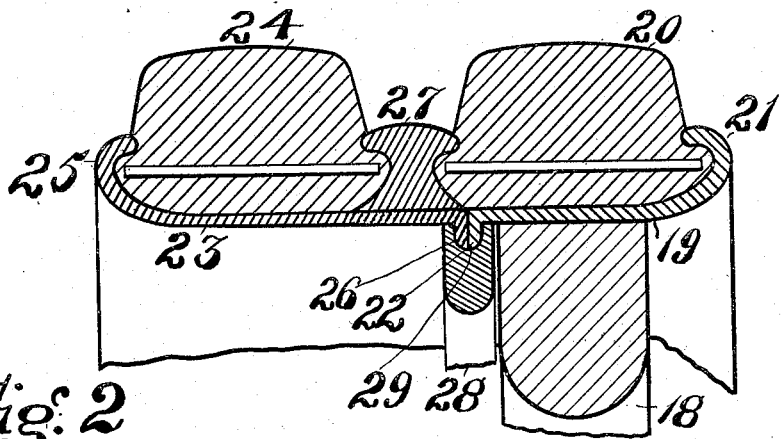
Figure 3:
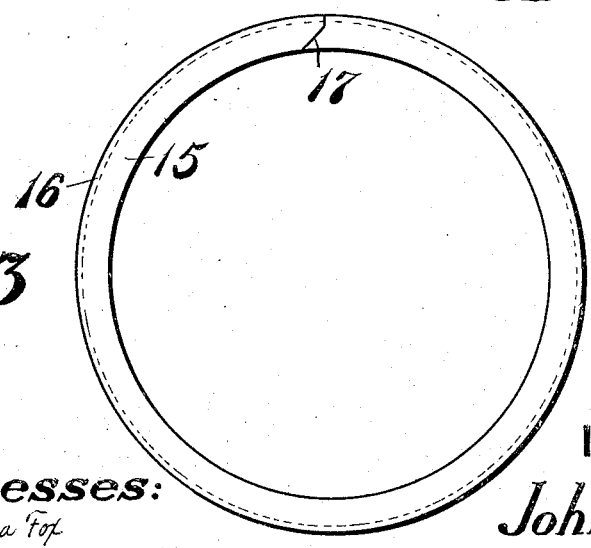

Referring to the drawings: Figure 1 is a cross sectional view of a rim and tire portion of a wheel constructed in accordance with this invention also showing in cross section my improved locking means for detachably securing the associated members of a wheel rim together, said retaining-means arranged in operative relation with respect to a rim on which is mounted a common form of tire, said rim provided with outwardly-projecting side flanges. Fig. 2 is a view of a modification of the rim shown in Fig. 1 also showing in cross section my improved locking device, said rim arranged in operative relation with respect to that form of tire known as the clencher type, and, Fig. 3 is a view in side elevation of my improved locking ring.

Referring to the type of rim shown in Fig. 1, the reference numeral 1 denotes a wheel felly on which is mounted an annular rim 2 the outer face of which constitutes a seat for a tire 5 and having along one of its lateral edges an outwardly-projecting flange 3 with an inclined inner face and along its opposite edge a depending or inwardly-extending flange 4.

Arranged to coöperate with the rim 2 is a second rim 6 the outer face of which constitutes a seat for a tire 7 provided along both of its side edges with depending flanges 8 and 9 and having arranged circumferentially on its outer face a projecting annular ridge 10 with inclined sides constituting retaining means for the inner sides of the tires 5 and 7. The tire-retaining means for the opposite side of the tire mounted on the rim 6 comprises an endless annular member 11 having an outwardly-projecting flange 12 with an inclined inner face to receive the tire and with a depending flange 13 similar to the flanges 4, 8 and 9.

The locking means for retaining the members 2 and 6 in position as well as securing the retaining means 11 in operative relation with a tire consist of two split rings 14 and 15 each preferably provided with U-shaped outer faces in which is formed an approximately centrally-disposed circumferential groove 16 adapted to receive the inwardly-extending flanges of the rims and member 11. These locking rings are split as at 17 and are self-expansible in that they will return to their annular shape when temporarily distorted in applying them in position.

In setting up a vehicle wheel provided with a rim made in accordance with Fig. 1, a tire 5 is first mounted on the seat on the rim 2. The rim 6 is then disposed in parallel relation therewith both laterally and circumferentially so that the flange 4 of the rim 2 is in abutting relation with the flange 9 of the rim 6. The locking ring 15 is then sprung into position by first bending inwardly one of the ends thereof sufficiently to permit the opposite end to inclose the combined abutting flanges of the two rims and afterward the balance of the ring is gradually forced into clamping relation therewith, this being aided by the self-expansive or resilient nature of the ring. A tire 7 is then disposed on the seat on the rim 6 and the tire-retaining member placed in position laterally by applying sufficient pressure thereto to cause the flange 12 thereof to engage the lateral face of the tire and the depending or inwardly-extending flange 13 to abut against the flange 8 of the rim 6. The locking ring 14 is then sprung into position to receive the combined abutting flanges 8 and 13 of the two members in the same manner as has been described with reference to the locking ring 15. To remove the tires from the rim the reverse of the foregoing operation is carried out.

Referring to the device shown in Fig. 2, the reference numeral 18 denotes the wheel felly on which is mounted a rim 19, the outer face of which constitutes a seat for a tire 20 and having one side edge 21 inwardly-bent forming a hook to constitute a tire-holding or retaining means and further provided with an inward or depending flange 22 along its opposite side edge.

Adapted to coöperate with the rim 19 is a second rim 23 the outer face of which forms a seat for a tire 24 and having one lateral edge thereof 25 inwardly-bent to constitute a tire-retaining means and further provided with a depending or inwardly-extending annular flange 26.

Mounted on the seat on the rim 23 is an annular tire-retaining member 27 having its side faces hook-shaped to constitute tire-retaining means for coöperating with the inturned lateral edges 21 and 25. The locking means for the form of rim just described consists of a split ring 28 preferably provided with a U-shaped face and a circumferentially-arranged groove 29 in its outer face adapted to receive the flanges 22 and 26 of the rims 19 and 23 when in abutting relation, as clearly shown in the drawings. As already described with reference to the rings 14 and 15 this ring is split and is self-expansive so as to return to its annular formation after distortion.

In setting up a vehicle wheel provided with a rim in accordance with Fig. 2, the tire 20 is first slipped laterally onto the seat on the rim 19 until one of its lateral faces is in engaging relation with the inturned lateral edge 21 and a second tire 24 is then mounted on the rim 23 in precisely the same manner as has been described with reference to the tire 20. The tire-retaining ring 27 is then slipped laterally onto the seat on the rim 23 until its hook-shaped lateral face is in engaging relation with the tire 24. The rim 23 is then disposed in lateral and parallel relation with the rim 19 so that the flanges 22 and 26 are in abutting relation with each other as shown in the drawings and the retaining ring 27 is in engaging relation with the two tires 20 and 24. The ring 28 is then sprung into position in the manner already described with reference to the rings 14 and 15 thereby securely locking the two rims 19 and 23 in position.

From the foregoing it will be seen that a rim of substantially any width may be produced by increasing the number of the individual members and uniting them in abutting relation with each other by means of the self-expansible spring locking rings hereinbefore described.

It will be obvious from the drawings and description heretofore given in connection with the type of rim shown in Fig. 1 that the auxiliary or complementary rim 6 may be omitted and the tire-retaining member 11 positioned in coöperating relation with the tire 5 by bringing its depending or inwardly-extending flange 13 into abutting relation with the flange 4 of the rim 2 and when thus set up either of the locking rings 14 or 15 may be employed for securing the two members of the rim together.

What I claim and desire to secure by Letters Patent, is:—

1. The combination in a vehicle wheel, of a rim mounted thereon provided with a seat for a tire and a retaining means along one side edge thereof, said rim further provided with a depending or inwardly-extending flange along its opposite side edge, a second or complementary rim carrying a tire-retaining means along one side edge and provided with an inwardly-extending flange disposed in abutting relation with the depending flange of the first rim, and a locking element comprising an exteriorly-circumferentially-grooved, split, self-expansible ring adapted to be sprung over and receive in its grooved outer surface the abutting flanges of said rims for retaining them detachably in position.

2. The combination in a vehicle wheel, of a rim mounted thereon provided with a seat for a tire and a tire-retaining means along one side edge thereof, said rim further provided with a depending or inwardly-extending flange along its opposite side edge, a second or complementary rim provided with a tire-retaining means along one side edge and further provided with two inwardly-extending flange, one of which is adapted to be disposed in abutting relation with the depending flange of the first rim, an annular tire-retaining means coöperating with said second rim provided with an inwardly-extending flange arranged in abutting relation with the second depending flange on said second rim and locking elements comprising exteriorly-grooved, split, self-expansible rings adapted to be sprung over and receive in their outer grooved portions the abutting flanges of said rims.

3. The combination in a vehicle wheel, of a rim mounted thereon provided with a seat for a tire and a tire-retaining means along one side edge thereof, said rim further provided with a depending or inwardly-extending flange along its opposite side edge, a second or complementary rim provided with two inwardly-extending flanges, one of which is adapted to be disposed in abutting relation with the depending flange of the first rim, an annular tire-retaining means coöperating with said second rim provided with an inwardly-extending flange arranged in abutting relation with the second depending flange on said second rim, locking elements comprising exteriorly-grooved and split, self-expansible rings adapted to be sprung over and receive in their outer grooved portions the abutting flanges of said rims.

In testimony whereof I have hereunto set my hand in presence of two subscribing witnesses.

JOHN M. ALDERFER.

Witnesses:
C. E. HUMPHREY,
HANK FOX.